Nov. 5, 1940.                S. FINDLATER                2,220,643
                              WIPING DEVICE
                            Filed Jan. 15, 1938
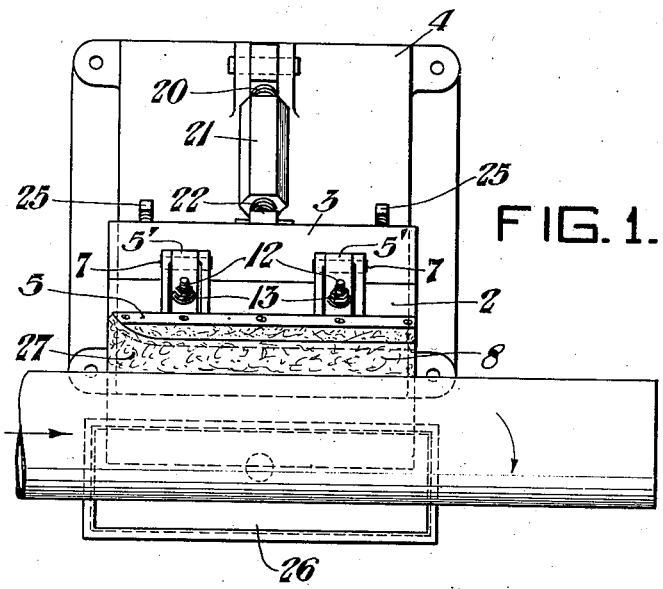
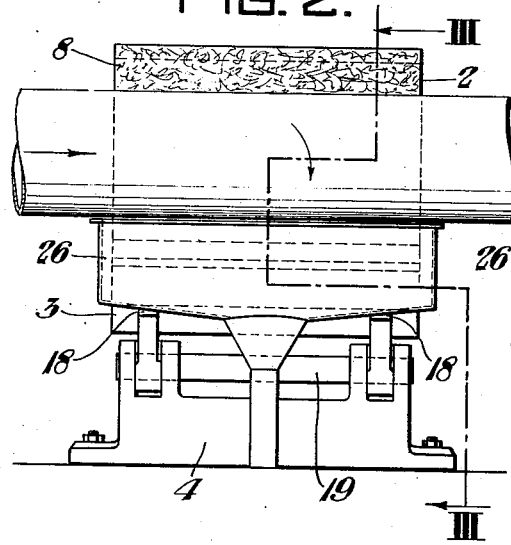
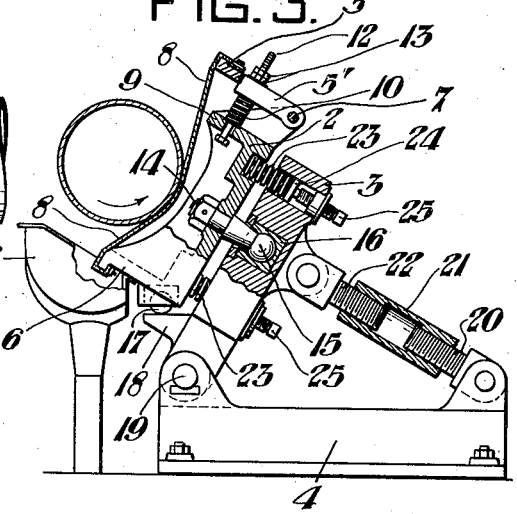
Inventor:
STEVENSON FINDLATER,
by: Usina & Rauber
his Attorneys.

Patented Nov. 5, 1940

2,220,643

UNITED STATES PATENT OFFICE 2,220,643

WIPING DEVICE

Stevenson Findlater, McKeesport, Pa., assignor to National Tube Company, a corporation of New Jersey Application January 15, 1938, Serial No. 185,249

5 Claims. (Cl. 15—97)

This invention relates to a wiping device and, more particularly, to an improved wiping device for removing the excess lubricant from cylindrical metal articles, such as pipe and tubular stock.

In the manufacture of metal pipe, rod stock, tubes and the like, it is desirable for various reasons to coat the surface thereof with a suitable lubricant, such as oil. The lubricant is usually sprayed onto the pipes or rods but usually there is no means provided for accurately controlling the amount of lubricant applied, nor for recovering or removing any surplus which might be present after it has been applied. Often, if an excessive amount of lubricant is applied to the pipes or rods, it accumulates on one side thereof, forming festoons which are undesirable to the corrosion resistant properties of the coating; also, the applying of an excess coating of oil is wasteful and expensive.

It is an object of this invention to provide an improved wiping device which will remove the excess lubricant from the surface of pipes and similar cylindrical articles and, at the same time, leave a suitable coating of the lubricant thereon.

It is another object of this invention to provide an inexpensive wiping device for removing excessive lubricant from such articles which can be easily and quickly adjusted relative to the size of the article with which it is to be used.

It is a further object of the invention to provide a wiping device which will recover the excess lubricant removed from such articles, thereby resulting in a substantial saving in the quantity of the lubricant used.

Various other objects and advantages of my invention will more fully appear during the course of the following specification, and will be particularly pointed out in the appended claims.

In the accompanying drawing, I have shown, for the purpose of illustration, one embodiment which my invention may assume in practice.

In the drawing:

Figure 1 is a plan of the improved wiping device of my invention;

Figure 2 is a side elevation thereof; and,

Figure 3 is a sectional view taken on the line III—III of Figure 2.

There is shown in the drawing the wiping device of my invention which comprises a body member or wiper-head 2, a holder 3 and a base 4 which preferably is suitably mounted on the oiling machine at the outlet side thereof.

The head 2 has upwardly extending side-walls 5 and 6; the side-wall 6 being an integral part of the head 2 and the side-wall 5 pivoted at 7 to the outer edge of the head, preferably by means of a pair of arms 5'. A piece of carpet or other suitable fabric-like material 8 is stretched across the side-walls of the head and attached thereto in any suitable manner. There is arranged on the inner side of the pivoted wall 5 an inner-wall 9 with coil springs 10 mounted on a pair of bolts 12 arranged between these walls and having adjusting nuts 13 on the outer ends thereof.

The head 2 is centrally mounted on holder 3 by means of a bolt 14, having a ball-head 15 positioned in a socket portion 16 of the holder 3. The lower front edge of the head is preferably supported by a ball-bearing member 17 which, in turn, is supported by a lower extending portion 18 of the holder. Such an arrangement of the head on the holder provides a pivotal support which permits a substantial floating or universal movement of the head; the downward movement of the head is positively limited in that direction by the stop member 17 and yieldable in all other directions by the coil springs 23, thereby allowing the head to adjust itself relative to the pipe. This movement of the head permits the full length of the wiping material 8 to contact the pipe regardless of the directional change of the axis of rotation of the pipe or any other unintended movement thereof.

The lower edge of the holder 3 is pivoted by means of shaft 19 to the inner edge of the base 4 and attached to the outer edge thereof by means of a connection comprising a threaded stud 20 which is also pivotally attached to the holder, an adjusting nut or knuckle 21, and a similar threaded stud 22 which is pivotally attached to the bottom of the holder 3.

There is arranged, preferably on each side of the universal connection 15, 16 between the adjacent portions of the head and holder and preferably in corresponding apertures therein, a pair of springs 23. Each of these springs is adapted to bear against a piston-like disk 24 mounted on the ends of adjusting-screws 25 positioned in the bottom of the apertures on the holder. These adjusting-screws 25 are provided for the purpose of adjusting the floating movement of the head 2 upon the holder 3.

An oil or lubricant channeled funnel-like receptacle 26 is positioned preferably just beneath the lower front edge of the wiping-head 2 and under the pipe or article to be wiped, so as to convey the surplus oil back to the reservoir where it can be used again. It will be noted that the entering side of the wiping-head 2 is flared at 27 so that any coupling or thread-protector on the pipe will not tear the wiping material or otherwise damage the wiper as it passes therealong.

It will be understood that this wiping device is stationary and the excess lubricant is removed from a continuous length of pipe as it comes in contact therewith. The wiping material 8 is urged against the pipe by action of the coil springs 7 and the degree of tautness of the flexible wiping material, that is the force which the springs exert against the pivoted wall 5' to yieldably hold the wiping material in contact with the pipe, is adjusted by means of the adjusting nut 21 which, in turn, moves the holder 3 and the head 2 toward and away from the path of travel of the pipe. It will be understood that the purpose of the adjusting nuts 13 on the bolts 12 is merely to adjustably limit the outward movement of the pivoted wall 5' when the wiping device is not in operation, that is, when the flexible wiping material is not in contact with the pipe. By means of these several adjustments the quantity of oil left on the tube can be easily controlled. It has been found that the wiping device of my invention operates much better if it is placed so that the lower side of the pipe or tube rotates toward the wiper.

While I have shown and described an embodiment of my invention, it will be understood that this embodiment is merely for the purpose of illustration and description and that various other forms may be devised within the scope of my invention, as defined in the appended claims.

I claim:

1. A wiping device of the class described comprising a wiper-head, a strip of flexible wiping material arranged on said head, a holder for supporting said head, said wiper-head being mounted for universal movement on said holder so that the wiping material will be automatically adjusted relative to the surface of a cylindrical article being wiped thereby as the article passes continuously and longitudinally therealong and in contact therewith, a rigid support for said holder, one side of said holder being pivotally attached to said support, and means arranged between the holder and the support adjacent the other side thereof for adjusting the position of the holder about said pivotal connection relative to the size of the cylindrical article to be wiped.

2. A wiping device for cleaning cylindrical stock and the like comprising a flexible strip of wiping material, means for supporting said wiping material at its ends, resilient means arranged with at least one of the end supports for said wiping material for stretching the same, means for holding said strip supporting means, and means for mounting said strip supporting means for universal movement on said last mentioned means so that the strip supporting means together with the strip of wiping material carried thereby will be automatically adjusted relative to the surface of the cylindrical stock being wiped as the stock passes continuously therealong in contact therewith.

3. A wiping device for cleaning cylindrical stock and the like comprising a flexible strip of wiping material, means for supporting said wiping material at its ends, resilient means arranged with at least one of the end supports for said wiping material for stretching the same, means for holding said strip supporting means, means for mounting said strip supporting means for universal movement on said last mentioned means so that the supporting means together with the strip of wiping material carried thereby will be automatically adjusted relative to the surface of the cylindrical stock being wiped as the stock passes continuously therealong in contact therewith, and adjustable means for moving the position of said holding means in a plane substantially perpendicular to the axis of the cylindrical stock to be wiped.

4. A wiping device for cleaning cylindrical stock and the like comprising a wiper-head member, a strip of flexible wiping material arranged on said member and supported thereon at its ends, resilient means arranged on said wiper-head member at least at one of the end supports for said wiping material for stretching the same, means for holding said wiper-head member, means for mounting said wiper-head for universal movement on said last mentioned means, yieldable means arranged between said wiper-head and said holding means to permit limited universal movement of said wiper-head thereon so that the wiper-head together with the strip of wiping material carried thereby will be automatically adjusted relative to the surface of the stock being wiped as the stock passes continuously therealong in contact therewith, and adjustable means for moving said wiper-head holding means in a plane substantially perpendicular to the axis of the cylindrical stock to be wiped.

5. A wiping device for cleaning cylindrical stock and the like as defined in claim 4 wherein the yieldable means arranged between said wiper-head and the holding means to permit limited universal movement of the wiper-head thereon consists of a plurality of springs arranged therebetween.

STEVENSON FINDLATER.